United States Patent
LaFlesh et al.

(10) Patent No.: US 9,669,351 B2
(45) Date of Patent: Jun. 6, 2017

(54) REMOVAL OF MERCURY EMISSIONS

(71) Applicant: ALSTOM Technology Ltd, Baden (CH)

(72) Inventors: Richard C. LaFlesh, Suffield, CT (US); John Iovino, Simsbury, CT (US); Shin G. Kang, Simsbury, CT (US); Carl D. Edberg, Stafford Springs, CT (US); Raymond W. Cournoyer, Enfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/079,145

(22) Filed: Mar. 24, 2016

(65) Prior Publication Data

US 2016/0199772 A1 Jul. 14, 2016

Related U.S. Application Data

(62) Division of application No. 13/552,758, filed on Jul. 19, 2012, now Pat. No. 9,321,002.

(Continued)

(51) Int. Cl.
*B01D 53/02* (2006.01)
*B01D 53/10* (2006.01)
(Continued)

(52) U.S. Cl.
CPC ............ *B01D 53/10* (2013.01); *B01D 53/12* (2013.01); *B01D 53/64* (2013.01); *B01D 53/83* (2013.01);
(Continued)

(58) Field of Classification Search
CPC ........ B01D 2253/102; B01D 2257/602; B01D 53/08; B01D 53/12; B01D 53/64;
(Continued)

(56) References Cited

U.S. PATENT DOCUMENTS 2,511,647 A 6/1950 Marshall
2,809,811 A 10/1957 Blomquist
(Continued)

FOREIGN PATENT DOCUMENTS

CA 2150529 A1 12/1995
CA 2418578 A1 8/2003
(Continued)

OTHER PUBLICATIONS

Beer, J.M., "Combustion Technology Developments in Power Generation in Response to Environmental Challenges", Progress in Energy & Combustion Science, vol. 26, 2000, pp. 301-327.
(Continued)

*Primary Examiner* — Christopher P Jones
(74) *Attorney, Agent, or Firm* — GE Global Patent Operation; Stephen G. Midgley

(57) ABSTRACT

A method for more efficiently removing pollutant gases from flue gases of a solid-fueled steam generator includes storing a silo a carbonaceous sorbent in a powdered form; extracting a superheated steam from a superheated steam source; and reducing a temperature, pressure and moisture content of the superheated steam to provide a processed steam of a desired pressure, temperature and moisture content. The method further includes providing a sorbent mill receiving the carbonaceous sorbent and the processed steam, wherein the sorbent mill is operable to de-agglomerate and comminute the carbonaceous sorbent using the processed steam to provide a processed sorbent. Further the method includes injecting the processed sorbent into the flue gases at a desired location in the solid-fueled steam generator thereby adsorbing the pollutants therefrom; and collecting and thereby remove the carbonaceous sorbent from the flue gas fluidly downstream from the desired location.

20 Claims, 2 Drawing Sheets

Related U.S. Application Data

(60) Provisional application No. 61/538,475, filed on Sep. 23, 2011.

(51) Int. Cl.
*B01D 53/12* (2006.01)
*B01D 53/64* (2006.01)
*B01D 53/83* (2006.01)
*F23J 15/02* (2006.01)
B01D 53/08 (2006.01)

(52) U.S. Cl.
CPC ............... *F23J 15/02* (2013.01); *B01D 53/08* (2013.01); *B01D 2253/102* (2013.01); *B01D 2257/602* (2013.01); *F23J 2215/60* (2013.01); *F23J 2219/30* (2013.01)

(58) Field of Classification Search
CPC ........ B01D 53/83; F23J 15/02; F23J 2215/60; F23J 2219/30
See application file for complete search history.

(56) References Cited

U.S. PATENT DOCUMENTS

| | | |
|---|---|---|
| 3,658,724 A | 4/1972 | Stiles |
| 3,662,523 A | 5/1972 | Revior |
| 3,961,020 A | 6/1976 | Seki |
| 4,273,747 A | 6/1981 | Rasmussen |
| 4,274,842 A | 6/1981 | Lindau |
| 4,500,327 A | 2/1985 | Nishino et al. |
| 4,530,291 A | 7/1985 | Wysk |
| 4,729,882 A | 3/1988 | Ide et al. |
| 4,843,980 A | 7/1989 | Markham et al. |
| 4,863,489 A | 9/1989 | Suggitt |
| 4,913,068 A | 4/1990 | Brannstrom |
| 5,024,169 A | 6/1991 | Borowy |
| 5,216,966 A | 6/1993 | Martin |
| 5,238,488 A | 8/1993 | Wilhelm |
| 5,245,120 A | 9/1993 | Srinivasachar |
| 5,308,590 A | 5/1994 | Kersey et al. |
| 5,345,883 A | 9/1994 | Panos |
| 5,435,843 A | 7/1995 | Roy |
| 5,435,980 A | 7/1995 | Felsvang et al. |
| 5,505,766 A | 4/1996 | Chang |
| 5,507,238 A | 4/1996 | Knowles |
| 5,556,447 A | 9/1996 | Srinivasachar et al. |
| 5,607,496 A | 3/1997 | Brooks |
| 5,607,654 A | 3/1997 | Lerner |
| 5,659,110 A | 8/1997 | Herden et al. |
| 5,672,323 A | 9/1997 | Bhat et al. |
| 5,674,459 A | 10/1997 | Gohara |
| 5,695,726 A | 12/1997 | Lerner |
| 5,787,823 A | 8/1998 | Knowles |
| 5,809,910 A | 9/1998 | Svendssen |
| 5,854,173 A | 12/1998 | Chang et al. |
| 5,875,722 A | 3/1999 | Gosselin, Jr. et al. |
| 5,900,042 A | 5/1999 | Mendelsohn et al. |
| 6,027,551 A | 2/2000 | Hwang et al. |
| 6,083,289 A | 7/2000 | Ono et al. |
| 6,103,205 A | 8/2000 | Wojtowicz et al. |
| 6,202,574 B1 | 3/2001 | Liljedahl |
| 6,242,098 B1 | 6/2001 | Styron et al. |
| 6,250,235 B1 | 6/2001 | Oehr et al. |
| 6,284,208 B1 | 9/2001 | Thomassen |
| 6,294,139 B1 | 9/2001 | Vicard |
| 6,322,613 B1 | 11/2001 | Wojtowicz et al. |
| 6,372,187 B1 | 4/2002 | Madden et al. |
| 6,375,909 B1 | 4/2002 | Dangtran |
| 6,447,740 B1 | 9/2002 | Caldwell |
| 6,451,094 B1 | 9/2002 | Chang et al. |
| 6,521,021 B1 | 2/2003 | Pennline et al. |
| 6,558,454 B1 | 5/2003 | Chang et al. |
| 6,719,828 B1 | 4/2004 | Lovell et al. |
| 6,808,692 B2 | 10/2004 | Oehr et al. |
| 6,818,043 B1 | 11/2004 | Chang et al. |
| 6,878,358 B2 | 4/2005 | Vosteen et al. |
| 6,953,494 B2 | 10/2005 | Nelson, Jr. |
| 6,974,564 B2 | 12/2005 | Biermann et al. |
| 7,033,548 B2 | 4/2006 | Pahlman et al. |
| 7,282,189 B2 | 10/2007 | Zauderer |
| 7,361,209 B1 | 4/2008 | Durham et al. |
| 7,381,387 B2 | 6/2008 | Lissianski |
| 7,744,678 B2 | 6/2010 | Laudet et al. |
| 7,776,298 B2 | 8/2010 | Herden et al. |
| 7,780,765 B2 | 8/2010 | Srinivasachar et al. |
| 2002/0068030 A1 | 6/2002 | Nolan |
| 2002/0114749 A1 | 8/2002 | Cole |
| 2002/0114750 A1 | 8/2002 | Holste |
| 2002/0150516 A1 | 10/2002 | Pahlman et al. |
| 2003/0103882 A1 | 6/2003 | Biermann et al. |
| 2003/0185718 A1 | 10/2003 | Sellakumar |
| 2004/0086439 A1 | 5/2004 | Vosteen et al. |
| 2004/0244657 A1 | 12/2004 | Srinivasachar et al. |
| 2005/0039598 A1 | 2/2005 | Srinivasachar et al. |
| 2005/0135981 A1 | 6/2005 | Chang |
| 2008/0292512 A1 | 11/2008 | Kang |
| 2010/0233052 A1 | 9/2010 | Chao et al. |
| 2011/0015458 A1 | 1/2011 | Waycuilis et al. |

FOREIGN PATENT DOCUMENTS

| | | |
|---|---|---|
| CN | 1943842 A | 4/2007 |
| CN | 101126592 A | 2/2008 |
| DE | 4218672 | 8/1993 |
| DE | 4339777 A1 | 5/1995 |
| DE | 4422661 A1 | 1/1996 |
| DE | 19850054 | 5/2002 |
| DE | 102004044291 A1 | 3/2006 |
| EP | 0016290 A1 | 1/1980 |
| EP | 0208036 A1 | 1/1987 |
| EP | 0253563 A1 | 1/1988 |
| EP | 0709128 A2 | 5/1996 |
| EP | 1040865 A2 | 10/2000 |
| EP | 1275430 A2 | 1/2003 |
| EP | 1077757 B1 | 3/2003 |
| EP | 1386655 A1 | 2/2004 |
| EP | 1645231 A1 | 4/2006 |
| EP | 1645323 A | 4/2006 |
| GB | 2122916 A | 1/1984 |
| JP | H02303519 A | 12/1990 |
| JP | 2000-197811 A | 7/2000 |
| JP | 2000-325747 A | 11/2000 |
| WO | 9320926 A1 | 10/1993 |
| WO | 9614137 A1 | 5/1996 |
| WO | 0744500 A1 | 11/1997 |
| WO | 9958228 A1 | 11/1999 |
| WO | 02093137 A1 | 11/2002 |
| WO | 03093518 A1 | 11/2003 |

OTHER PUBLICATIONS

Biswas et al. "Control of Toxic Metal Emissions from Combustors Using. Sorbents: A Review", Air & Waste Management Association, vol. 48 (1997), pp. 113-127.

Butz et al., "Options for Mercury Removal from Coal-Fired Flue Gas Streams: Pilot- Scale Research on Activated carbon, Alternative and Regenerable Sorbents," 17th Annual Int. Pittsburgh Coal Conf Proceedings, Pittsburgh, PA, Sep. 11-14, 2000, 25 pages.

Cao, et al, "Impacts of Halogen Additions on Mercury Oxidation, in a Slipstream Selective Catalyst Reduction (SCR), Reactor When Burning Sub-Bituminous Coal," Environmental Science Technology (Nov. 30, 2007), pp. 256-261.

Chase et al., "JANAF Thermochemical Tables" Journal of Physical and Chemical Reference Data 3rd ed. 1985 (various).

Kilgroe, et al. "Control of Mercury Emissions from Coal-Fired Electric Utility Boilers: Interim Report", EPA-600/R-01-109, U.S, Envti. Prot Agency, Office of Air Quality Planning & Standards, prepared by National Risk Management Research Laboratory, Research Triangle Park, NC (Apr. 2002) pp. 1-345 and Appendix 139 pages.

(56) References Cited

OTHER PUBLICATIONS

Cotton et al., "Advanced Inorganic Chemistry" 3rd ed. 1972, Interscience Publishers, Chapter 16-1, p. 458.
Element Analysis of COALQUAL Data, obtained from file history of Reexamination Control U.S. Appl. No. 95/001,368.
Fujiwara et al., "Mercury Transformation Behavior on a Bench-Scale Coal Combustion Furnace," Advances in Air Pollution, 10 Air Pollution IX, 2001, pp. 395-404.
Babcock & Wilcox Company et al. "Full- Scale Testing of Enhanced mercury Control Technologies for Wet FGD System", Final Edition May 7, 2003, 151 pages.
Galbreath et al., "Mercury Transformations in Coal Combustion Flue Gas," Fuel Processing Technology, vol. 65-66 2000, pp. 289-310.
Ganapathy, V. "Recover heat From Waste Incineration, "Hydrocarbon Processing Sep. 1995, pp. 1-4.
Getman, Frederick H., "Equilibrium in the System H20-MgBr2," Hillside Laboratory, Stamford, Connecticut, Aug. 31, 1935, pp. 866-872.
Ghorishi et al., "An Experimental Study on Mercury Sorption by Activated Carbons and Calcium Hydroxide," U.S, Envtl. Prot. Agency, Report: EPN600/A- 981011 (1998), pp. 795-808.
Granite et al., "Novel Sorbents for Mercury Removal from Flue Gas," Separations, Ind. Eng. Chem. Res. (2000), 39, pp. 1020-1029.
Hall et al, "Chemical Reactions of Mercury in Combustion Flue Gases," Water, Air, & Soil Pollution, vol. 56 (1991) pp. 3-14.
Harlow et al., "Ash Vitrification—A Technology Ready Fortransfer," presented at the National Waste Processing Conference, 14th Biennial Conference Long Beach, CA, Jun. 3-Jun. 6, 1990, pp. 143-50.
Hewlett, Peter C, Lea's Chemistry of Cement and Concrete (4th ed. 1998), pp. 34-35.
Himes et al., "A Summary of SNCR Applications to Two Coal-Fired Wet Bottom Boilers," EPRT/EPA 1995 Joint Symposium on Stationary Combustion NOx Control, Book 4: Friday, May 19th, 1995, Sessions. 8A and 8B, 22 pages.
Hower et al, "Mercury Capture by Native Fly Ash Carbons in Coal-Fired Power Plants," Progress in Energy & Combustion Science 36 (2010) 510-29.
Janaf Thermochemical Tables, Dec. 5, 2000, J. Phys. Chem. Ref. Data, vol. 14, Suppl.1 (1985) (various).
Jones et al. "Design Optimization of SNCR DENOx, Injection Lances, " EPRI/EPA 1995 Joint Symposium on Stationary Combustion NO Control, Book 4: Friday, May 9th, 1995, Sessions 8A and 8B, 15 pages.
Julien et al., "The Effect of Halides on Emissions From Circulating Fluidized Bed Combustion of Fossil Fuels," Fuel vol. 75, No. 14, pp. 1655-63 (1996).
Kaneko et al., "Pitting of Stainless Steel in Bromide, Chloride and Bromide/Chloride Solutions," Corrosion Science 42 (2000) pp. 67-78.
Kreider, J. L, "The Behavior of Typical Hydrous Bromides when Heated in an Atmosphere of Hydrogen Bromide," Am. J. of Sci.—Fourth Series, vol. XX, No. 116 (Aug. 1905), pp. 97-106.
Dean, "Lange's Handbook of Chemistry" 14th ed. 1992, pp. 3.22 to 3.24, McGraw-Hill.
Lee et al., "Mercury Control Research: Effects of Fly Ash and Flue Gas Parameters ', on Mercury Speciation," Fuel Energy Abstr., (Jan. 2002), pp. 221-238, (from the Annual Waste-to-Energy Conference, Proceedings of the Specialty conference, 6th, May 11-13, 1998), 19 pages.
Li et al., "Effect of Moisture on Adsorption of Elemental Mercury by Activated Carbons," Report No. EPAi600/A-00/104, U.S, Envtl. Prot. Agency, Office of Research & Dev., Nat'l Risk Mgmt Research Lab. (MD-65) (2000), pp, 1-Li to 13-Li.
Li et al., "Mercury Emissions Control in Coal Combustion Systems Using Potassium Iodide: Bench-Scale and Pilot-Scale Studies," Energy')' & Fuels, Vol. 23 (2009), pp. 236-243.
Pauling, L., General Chemistry (2d ed. 1958), pp. 100-106, 264, W.H. Freeman & Co.

Meij et al, "The Fate and Behavior of Mercury in Coal-Fired Power Plants," J. of the Air & Waste Mgmt. Ass'n, vol. 52 (Aug. 2002), pp. 912-917.
Mercury Study Report to Congress, vol. VIII: An Evaluation of Mercury Control Technologies and Costs, EPA-452/R-97-010, U.S Envtl. Prot. Agency, Office of Air Quality Planning & Standards & Office of Research & Dev. (Dec. 1997), 207 pages.
"Metals Handbook" Ninth Edition, vol. 13 Corrosion ( 1987), pp. 997-998, ASM International.
Moberg et al., "Migration of Trace Elements During Flue Gas Desulfurization", Report (1982), Abstract, 1 pages.
Pasic et al., "Membrane Electrostatic Precipitation," Ctr. for Advanced Materials Processing, Ohio Coal Research Center, Department of Mechanical Engineering, Ohio Univ., pp, 1- Bayless to 10-Bayless on or before 2001.
Paulik et al., "Examination of the Decomposition of CaBr2 with the Method of Simultaneous TG, DTG, DTA and EGA," Journal of Thermal Analysis, vol. 15 (1979), pp. 271-277.
Lee, et al., "Pilot-Scale Study of the Effect of Selective Catalytic Reduction Catalyst on Mercury Speciation in Illinois and Powder River Basin Coal Combustion Flue Gases", J. Of the Air & Waste Mgmt. vol. 56, May 2006 pp. 643-649.
Perry, et al., "Perry's Chemical Engineers' Handbook", 7th ed. 1997, p. 18-74, McGraw-Hill.
"Pollution Prevention and Abatement Handbook" World Bank Group ed. Apr. 1999, pp. 219-22.
Robinson et al., "The Hydrolytic Action of Low-Pressure Super-Heated Steam on Salts of the Alkaline-Earth Metals," Univ. Of Durham, Armstrong College, Newcastle-Upon-Tyne (Feb. 4, 1926), pp. 836-39.
Senior et al. "Gas-phase transformations of mercury in coal-fired power plants," Fuel Processing Technology, vol. 63 2000, pp, 197-213.
Singer, Joseph G., "Combustion Fossil Power, Combustion Engineering, Inc.", Windsor Connecticut (4th ed. 1991), pp. 2-I to2-43,3-I to3-34, 11-I to 11-37.15-1 to I5-76, 16-I to 16-33, A-I to A-55, B-1 to B-18.
Budavari, Susan, et al., "The Merck Index" 12th ed. 1996 pp. 271-272, 274, 1003-1005.
Turner et al., "Fabric Filters," in QAQPS Control Cost Manual, U.S. Envtl. Prot Agency, office of Air Quality Planning & Standards, ch. 5, pp. 5-2 to 5-64 ;1998.
Uehara et al., "Thermal Ignition of Calcium Hypochlorite," Combustion & Flame 32 (1978), pp. 85-94.
Urano, "Studies on Bleaching Powder. YTL The Decomposition of Calcium Hypochlorite by Heat in the Presence of Calcium Chloride," I Soc. Chem. Ind. Japan (1928), pp. 46-52, with English abstract.
U.S. Dep't of Energy, "The Fire Below: Spontaneous Combustion in Coal," Environmental Safety & Health Bulletin, DOE/EH-0320, Issue No, 93-4 (May 1993) 9 pages.
Van Otten et al., "Gas-Phase Oxidation of Mercury by Bromine and Chlorine in Flue Gas," Energy & Fuels, ACS Publications, 2011, 25, pp. 3530-36.
Vracar, Rajko Z, "The Study of Chlorination Kinetics of Copper(I) Sulfide by calcium ,Chloride in the Presence of Oxygen," Metallurgical & Materials Transactions B, vol. 31B (Aug. 2000), pp. 723-31.
Weast et at. "CRC Handbook of Chemistry and physics", 63d ed. 1982-1983, pp. F76 to F77, CRC Press.
Yang et al., "CaBr2 Hydrolysis for HBr Production Using a Direct Sparging Contactor," Int'l J. of Hydrogen Energy, vol. 34 (2009), pp. 7585-91.
Dombrowski et al:"Balance of Plant Impacts of Bromide Addition for Mercury Control, "URS EPRI, Presented at Air Quality Conference IX (Oct. 2013), 29 pages.
Felsvang et al, Activated Carbon Injection in Spray Dryer/ESP/FF for Mercury and Toxics Control,Fuel Processing Technology, Vol. 39 (1994), pp. 417-30.
Landreth, et al, "Extended Use of Concrete-Friendly TM C-PACTM Sorbent at PPL Montana Corette Station," Paper 43 (2012), pp. 1-12.

(56) References Cited

OTHER PUBLICATIONS

Meier et al., "Ash Compatible Mercury Control on a 600 MW Boiler," NALCO (2012), 8 pages.
Nelson, Sid Jr., "Sorbent Technologies for Mercury Control," Sorbent Technologies/Georgia dept of Envtl. Prot. (later than Apr. 2006), 42 pages.
Nelson, Sid, "Final Report: A Low-Cost, High-Temperature Mercury Sorbent for Coal-Fired Power Plants," EPA Contract No. 68D01075, (later than Sept 2003), 2 pages.
Sjostrom et al, "Activated Carbon injection for Mercury Control: Overview," Fuel, vol. 89, 2010, pp. 1320-22.
Tidemann, Brent, "HCI and Mercury Mitigation with DSI and ACI," Nol-Tec Systems, 2013 Energy, Utility & Environment Conference, Jan. 29, 2013, pp. 1-23.
Wanninger et al., "Next-Generation Activated Carbon Performance in Emission System," Paper 70, Midwest,1st Generation EME/ADA Carbon Solutions., LLC (2012).
Norit "Improved Mercury removal performance Using New DARCO Hg-LH Extra in Challenging Application", (2012), pp. 1-12.
Starns et al., "Results of Activated Carbon Injection Upstream of Electrostatic Precipitators for Mercury control", The Mega Meeting: Power Plant Air Pollution Control Symposium, Washington, DC, May 19-22, 2003. pp. 1-22.
Triton Environmental Consultants Ltd., "Mercury Emissions-to Air from Canadian Electric Power Generation Facilities: Deliverables 3—2ND Task Report" Jun. 2010, pp. 1-107.
Chang et al., "Near and Long Term Options for Controlling Mercury Emissions from Power Plants 10" 2010, pp. 1-15.
Feeley III, Thomas J. et al., "An Update on DOE/NETL's Mercury Control Technology Field Testing Program", 2008, pp. 1-33.
U.S. Dept of Energy Office of Fossil Energy, National Energy Technology Lab., 2005 "Accomplishments" Apr. 2006 pp. 1-46.
Nelson Jr., SID, "Advanced Utility Mercury—Sorbent Field-Testing Program: Semi Annual Technical Progress Report" Apr. 6, 2005; pp. 1-62.
Cichanowicz et al. "Powdered Activated Carbon (PAC) Characterization Tests for Coal—fired Utility Application", The 7th Power Plant Air Pollution Control "Mega" Symposium, Baltimore, MD, Aug 25-28, 2008, pp. 1-15.
The Babcock & Wilcox Company, "Steam: Its Generation and Use", 41st ed. 2005, ch. 29.
Tarabocchia et al., "Mercury Separation form Flue Gas and Scrub Water with Trimercapto-s-traiazine (TMT)," Control/Tracking Number: 03-A-15-AWMA 2003, 17 pages.
White, D.M. et al., "Emission Test REport: Field Test of Carbon Injection for Mercury Control" Camden County Municipal Waste Combustor, EPA-600/R-93-181; Sep. 1993, US.
Granite, Evan J. et al, "Sorbents for Mercury Removal from Fue Gas" US Dept of Energy Jan. 1998 US.
Non-Final Office Action in U.S. Appl. No. 12/185,478 dated Oct. 19, 2010.
Response to Non-Final Office Action dated Oct. 19, 2010 in U.S. Appl. No. 12/185,478.
Final Office Action in U.S Appl. No. 12/185,478 date Jul. 11, 2011.
Amendment and Response After Final Office Action date Jul. 11, 2011 in U.S. Appl. No. 12/185,478.
Advisory Office Action in U.S. Appl. No. 12/185,478 dated Oct. 6, 2011.
Request for continued Examination in U.S. Appl. No. 12/185,478 dated Dec. 15, 2011.
Final Office Action in U.S. Appl. No. 12/185,478 dated Feb. 14, 2013.
Non-Final Office Action in U.S. Appl. No. 12/164,400 dated Sep. 21, 2009.
Response to Non-Final Office Action dated Sep. 21, 2009 in U.S. Appl. No. 12/164,400.
Examiner Interview Summary in U.S. Appl. No. 12/164,400 date Apr. 21, 2010.
Notice of Allowance in U.S. Appl. No. 12/164,400 date Apr. 21, 2010.
Nelson, SID "2001 Progress Report: A Low-Cost High-Temperature Mercury Sorbent for Coal-Fired Power Plants," a 2001 publication from the EPA 2001 Annual Report. A copy online from EPA website http://cfpub.epa.gov/ncer_abstracts/index.cfm/fuseaction/display.abstractDetail/abstract/1283/report/2001.
Nelson, Jr., et al., "Novel Duct-Injection Mercury Sorbents", a research article presented at the Air Quality III Conference Sep. 9-12, 2002, Arlington, VA. Per the declaration of Dr. Constance Senior, a compact disc aontaining this article was received by Dr. Senior, i.e.. was publicly available, within about two months of the conference date, i.e.. by Nov. 12, 2002. US.
Nelson, Jr., et al., "Mercury Sorbent Injection Test Results at the Lausche Plant," a research article presented at the Air and Waste Management Association's (AWMA) Combiend Power Plant Air Pollution Control Mega Symposium, May 19-22, 2003, Washington, DC; Per the declaration of Dr. Constance Senior, this paper was provided during the conference, i.e. no later than May 22, 2003. US.
Nelson, Jr., et al., "Mercury Sorbent Results for a Hot-Side ESP at the Cliffside Plant", a power point presentation that was presented at the 7th Annual Electric Utilities Environmental Conference (EUEC), Jan. 19-22, 2004, Tucson, AZ. Per the declaration of Dr. Constance Senior, a compact disc containing this slide show was received by Dr. Senior, i.e. was publicly available, at least as early as Feb. 4, 2004 US.
PCT International Search Report and Written Opinion from the International Searching Authority dated Nov. 19, 2008 from PCT Application No. PCT/US2008/072186.
European Search Report and Written Opinion issued in connection with related EP Application No. 10184020.5 dated Feb. 1, 2011.
Written Opinion issued in connection with related PCT Application No. PCT/US2004/017383 dated Dec. 8, 2005.
European Office Action issued in connection with related EP Application No. 10184020.5 dated Sep. 23, 2011.
Carey et al., "Assessing Sorbent Injection Mercury Control Effectiveness in Flue Gas Streams", Environmental Progress, American Institute of Chemical Engineers, vol. No. 19, Issue No. 3, pp. 167-174, 2000.
Non-Final Rejection towards related U.S. Appl. No. 10/961,697 dated Sep. 14, 2005.
European Office Action issued in connection with related EP Application No. 10184020.5 on Jan. 30, 2013.
European Search Report and Written Opinion issued in connection with related EP Application No. 05021227.3 dated Feb. 17, 2006.
Non-Final Rejection towards related U.S. Appl. No. 10/961,697 dated Jul. 10, 2007.
European Office Action issued in connection with related EP Application No. 09007497.2 dated May 19, 2011.
European Search Report and Written Opinion issued in connection with related EP Application No. 39007497.2 dated Sep. 23, 2009.
European Office Action issued in connection with related EP Application No. 04754074.5 on Mar. 27, 2009.

REMOVAL OF MERCURY EMISSIONS

CROSS-REFERENCE TO RELATED APPLICATIONS

The present application is a divisional of U.S. application Ser. No. 13/552,758, filed Jul. 19, 2012, which claims priority from U.S. Provisional Patent Application No. 61/538,475, filed Sep. 23, 2011. The present application is also related to U.S. Pat. No. 7,780,765 issued Aug. 24, 2010 that was a continuation of U.S. patent application Ser. No. 10/961,697, filed Oct. 8, 2004, which is a continuation-in-part of U.S. patent application Ser. No. 10/453,140, filed Jun. 3, 2003, now U.S. Pat. No. 6,848,374, all of which are incorporated by reference as if they were set forth in their entirety herein.

BACKGROUND OF THE INVENTION

The present invention relates to apparatus and a method for removing gaseous pollutants from the flue gas of solid fuel fired steam generators and more particularly to apparatus and a method for removing elemental mercury and mercury compounds from the flue gases from coal fired boilers.

The use of activated carbon and carbonaceous particles for the adsorption of pollutant gases, such as mercury vapor has been successfully demonstrated in various applications, such as municipal waste incineration. However, there are significant differences in the concentration of mercury from waste incinerators compared to coal-fired power plants with the concentration from the coal-fired power plants being anywhere from 10 to 100 times lower. Also, the mercury from waste incinerators is usually in the form of mercury chloride whereas a larger percentage of mercury from coal-fired power plants is usually in the form of elemental mercury. Both of these differences make it more difficult to remove the mercury from the flue gas from a coal-fired power plant.

The efficiency of the sorbent is limited by its surface area to mass ratio. A relatively large particle has a low available surface area/mass ratio that limits the adsorption of pollutant gas. Using a carbonaceous sorbent with mean particle size of about 5 microns with a maximum size of about 10 microns would improve adsorption efficiency, but storage, handling, transport and dispersion of these small particles is extremely difficult.

In conventional methods, the sorbent particles are injected in the flue gas duct upstream of particulate removal device such as baghouses and electrostatic precipitators and downstream of air heaters. The particle removal devices then collect the sorbent with the adsorbed the pollutant gases.

U.S. Pat. No. 7,780,765 issued Aug. 24, 2010 describes the injection of activated carbon into flue gas by using injected compressed air. This reduces mercury emissions in flue gases, but can become quite costly due to the need for equipment to provide the compressed air and the power the equipment uses.

It is also known in the art that vapor phase mercury in the flue gas emerging from the high temperature boiler is in the form of elemental mercury. Oxidation of elemental mercury to oxidized mercury ($Hg^{2+}$) is beneficial to mercury control since it can be removed more easily by carbonaceous sorbent. Similarly, combination of elemental mercury with halogens, results in a compound that has greater affinity for the sorbent.

Currently, there is a need for a system that efficiently and economically removes gaseous pollutants, such as elemental mercury and mercury compounds from combustion flue gases of solid fueled boilers.

SUMMARY OF THE INVENTION

The present invention may be embodied as a method for removing gaseous pollutants from flue gases generated by solid fuel fired boiler, the method comprising:

providing a carbonaceous sorbent in powdered form potentially having some agglomeration;

extracting superheated steam from the boiler;

processing the superheated steam to provide dry, high quality superheated steam of the proper pressure, temperature that is below a predetermined moisture content;

providing the processed steam to a sorbent mill to process the sorbent to deagglomerate it and to break the particles of the powdered sorbent into a greater number of smaller particles;

injecting the processed sorbent into contact with the flue gas to adsorb mercury and mercury compounds; and removing the sorbent having mercury adsorbed thereon from the flue gas.

The present invention may also be embodied as a pollution removal device for more efficiently removing pollutant gases from flue gases of a solid-fueled steam generator comprising:

a sorbent source for providing carbonaceous sorbent in powdered form;

a steam tap line for extracting superheated steam from said boiler 18;

a steam processing device coupled to the steam tap line for receiving the superheated steam from the steam tap line and for processing the steam to provide steam of a desired pressure, temperature and moisture content;

a sorbent mill coupled to the steam processing device and the sorbent source, adapted to receive sorbent from the sorbent source, and employ the processed steam to process the sorbent by de-agglomerating and comminuting particles in the sorbent;

a distributor coupled to the sorbent mill adapted to receive the sorbent and to inject the sorbent into said flue gases of the boiler thereby adsorbing the gaseous pollutant; and a particulate collection device adapted to collect the solid particles in the flue gas and remove them from the gases.

An object of the present invention is to provide a more efficient method of removing gaseous pollutants from flue gases.

Another object of the present invention is to provide a more efficient method of removing mercury and mercury compounds from flue gases.

Another object of the present invention to provide a more cost effective means of removing gaseous pollutants from flue gases.

It is another object of the present invention to provide a more cost effective costly means of removing mercury from flue gases.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
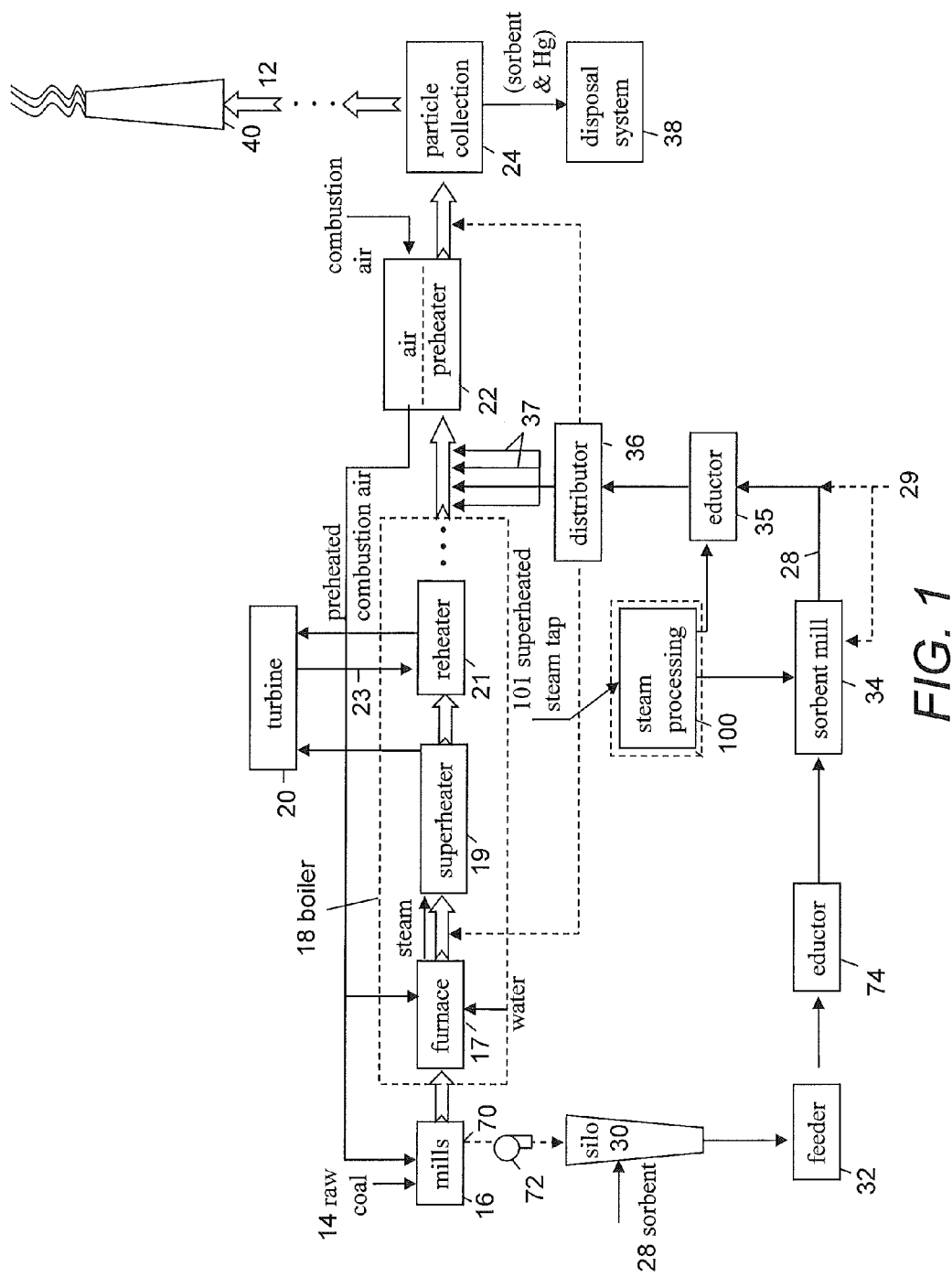
FIG. 1 is a schematic diagram of a first embodiment of a system in accordance with the present invention for removing gaseous pollutants from the flue gases created by a solid fueled boiler.

FIG. 1 shows an embodiment of the present invention incorporated into a solid fuel fired steam generator or boiler 18. This may be part of a coal-fired power plant.

The raw coal 14 is fed to at least one pulverizer/crusher, each referred to as a mill 16 where the raw coal is reduced to desired particulate size. Ambient air is provided to an air preheater 22 that preheats the air. The preheated air is provided as primary air to the mills 16 that carries the solid fuel particles that were pulverized in mills 16, to the furnace 17 of boiler 18, where the fuel particles are burned to boil water into steam.

Air preheater 22 also provides secondary air directly to furnace 17.

The temperature of the flue gases leaving the furnace 17 ranges from 1400 to 2200° F.

The steam created in the furnace 17 is provided to superheater 19. The hot flue gases are also provided to superheater 19. The superheater transfers heat from the flue gases to the steam creating superheated steam in headers typically at 600 psig that is provided to a steam turbine 20. The flue gases exit the superheater 20 with a temperature that is approximately 600 to 800° F.

The steam turbine 20 does various work, such as turning a generator to create electricity. The superheated steam that returns after running through at least one stage of steam turbine 20 is provided to a cold reheat inlet 23 of a reheater 21. The reheater 21 receives the flue gas and transfers the heat to the steam being returned from the steam turbine 20 to reheat it and returns the reheated steam to another stage of the steam turbine 20.

Some of the superheated steam returning from the turbine is routed, as one example, to a steam processing device 100, which will be discussed in more detail below.

The flue gases are then routed through the air preheater 22. Heat from the flue gases is transferred to the atmospheric inlet air that will be used as the primary and secondary air in the mills 16 and the furnace 17.

Flue gases exit the air preheater 22 with a temperature range from 220 to 370° F. and enter a particle separation device 24. The particle separation device 24 may be an electrostatic precipitator (ESP), a fabric filter 24 or other known device for collecting solid particulates entrained in a gas. The particle separation device 24 collects the solid particulates and provides them to a disposal system 38 for disposal.

A carbonaceous sorbent 28 in powdered form, such as activated carbon particles, or other carbon particles is stored in a silo 30. The sorbent 28 in silo 30 typically clumps together because very small particles thereof tend to stick to each other and agglomerate.

Accordingly, the sorbent 28 is fed by a feeder 32 to an eductor 74 that provides the sorbent 28 to a sorbent mill 34. Since this eductor is typically a significant distance from the sorbent mill 34, it is best to use air as a transport medium to blow the sorbent 28 to the sorbent mill 34. There is a risk of dropping the temperature to a level where condensation occurs if steam were used as the transport medium in this part of the system.

Superheated steam is provided from the cold reheat inlet 23 of the reheater 21. In this example, other sources of superheated steam are also available from boiler 18, including blending of streams of steam. This passes through the steam tap 101 to the steam processing device 100 that processes the superheated steam to reduce the pressure and temperature of the superheated steam, and to remove any residual condensation. The steam processing device 100 may also recover some heat energy for use elsewhere in the plant.

The processed steam is provided to the sorbent mill 34. The sorbent mill 34 breaks up the clumps in the sorbent 28 and de-agglomerates it. The sorbent mill 34 also operates to comminute the sorbent particles into a greater number of particles having a smaller size. The smaller size increases the available surface/mass ratio, allowing faster reaction time, while the greater number of particles causes a greater dispersion in the flue gases and increases the chances that the particles will physically contact the mercury gases, increasing the efficiency of the system.

Once the sorbent 34 is deagglomerated and comminuted, it is provided to a steam eductor 35 and/or piping to receive the processed steam from steam processing device 100 as the motive force. The steam eductor 35 and/or piping then sends the processed sorbent 28 to a distributor 36.

One such type of sorbent mill 34 compatible with the present invention is a jet mill. In prior art systems, air was compressed and forced into the separation device to cause clumps of agglomerated particles to be broken up. It required significant auxiliary plant energy to compress air to the point required by the separation device.

The present invention does not use compressed air as the energy source for de-agglomeration and comminuting the activated carbon particles. It uses superheated steam available in the power plant or facility. The logic of using steam is contrary to accepted logic, since steam typically has moisture and moisture causes agglomeration of powders.

However, by keeping the temperature above the condensation point, the moisture does not come out of its gaseous form, and does not create liquid droplets. In fact, superheated steam actually removes moisture from a powdered sorbent, reducing agglomeration.

Unfortunately, the pressure of the superheated steam in the headers of the system is on the order of 550 psig, or more. This is much higher than the pressure that can be used by the sorbent mill 34, typically about 100 psig. If the pressure of the superheated steam is too high, the separation device 34 can become damaged or non-functional. The cold reheat inlet 23 is available as one potential source for superheated steam. The cold reheat inlet can have superheated steam at a pressure of about 600 psig and a temperature of 635 Deg. F. Therefore, the steam must be modified to reduce the pressure and temperature.

During start-ups and shut-downs, the steam tap will have a temperature below that of the condensation temperature. As a result, moisture forms in the steam tap 101. As indicated above, moisture causes agglomeration, which reduces the efficiency of the system and should be avoided. Therefore, the superheated steam must be processed to result in the proper pressure/temperature while also removing moisture or condensation.

Figure 2:
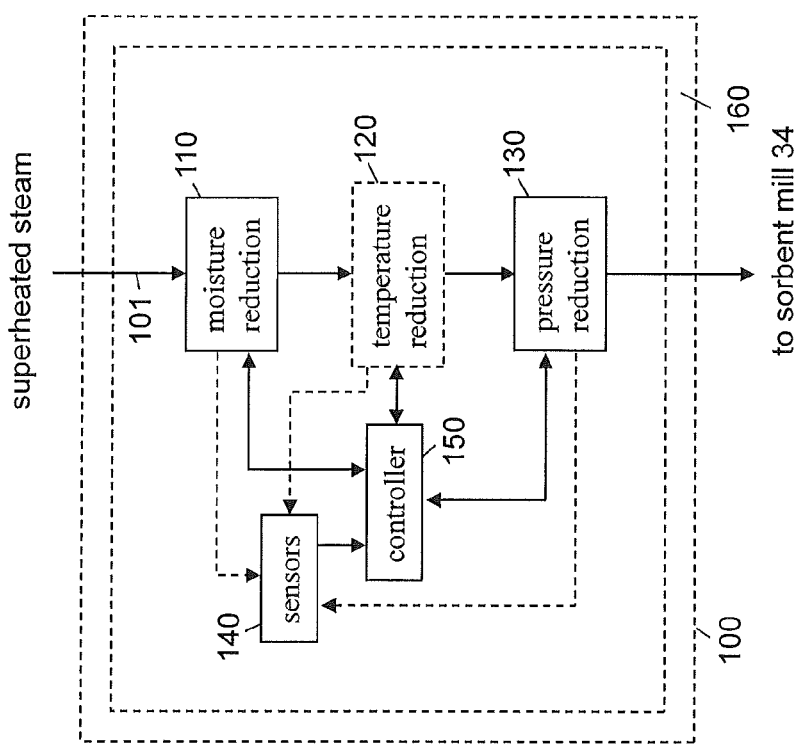
FIG. 2 is a more detailed, enlarged view of one example of a steam processing device of FIG. 1.

FIG. 2 shows a more detailed diagram of the steam processing device 100 of FIG. 1. Steam processing device 100 employs a moisture reduction unit 110 that may include water traps and/or driers that remove condensation from the superheated steam.

The superheated steam is then provided to a temperature reduction unit 120 that may include water sprayers and/or heat exchangers to de-superheat the steam provided to it. The temperature of the steam may be reduced by spraying small amounts of water into the steam. This amount must be accurately calculated and metered so that it will all remain in the vapor phase and not cause condensation throughout its use in the system.

The superheated steam is provided to the pressure reduction unit 130 that may include pressure reduction valves that can be operated by an external controller.

There are sensors 140 that measure at least one of the pressure and temperature in one or more locations in the steam processing device 100. These sensors 140 feed their measurements to a controller 150, which may be part of the steam processing device 100, or external to it.

Controller 150 functions, if necessary to read sensor input from the moisture reduction unit 110 to determine if there is condensation that should be removed. Controller 150 then actuates water trap valves and other equipment such as driers to remove the condensate. The controller 150 may also read valve settings, flow rates, total accumulated water removed, etc. to make its calculations and actuate parts of temperature reduction unit 120.

The controller 150 reads sensors 140 to determine the temperature and pressure, mass flow rate and other necessary parameters of the superheated steam at the location of the temperature reduction unit 120, to calculate the proper amount of water to spray into the superheated steam. It also operates to actuate valves within temperature reduction unit 120 to dispense the proper amount of water calculated if de-superheat spray is required.

Controller 150 also receives input from the sensors 140 indicating the temperature, pressure, mass flow rate and other necessary parameters of the superheated steam at the location of the pressure reduction unit 130, to calculate the proper valve opening for pressure reduction valves within the pressure reduction unit 130.

In one embodiment, the sensors 140 and controller 150 interactively perform their duties to provide superheated steam of a pressure of approximately 100 psig, temperature of 550 Deg. F. with minimal moisture.

Controller 150 may receive input and data from other processors of the system and/or operator input.

The processed steam is provided to the sorbent mill 34. Superheated steam has superheated water in vapor form. This has significantly more enthalpy than compressed air used in prior art devices.

The inherent energy in the superheated steam is expended during the deagglomeration and comminution of the sorbent 28. This results in finer grinding and at significantly reduced operating energy costs. The finer grinding allows more particles to be dispersed in the same volume. This reduces the spacing between particles and increases the probability that a sorbent particle comes in contact with the pollutant gases.

The sorbent mill 34 may be a particle-particle separator or a jet mill, where high-pressure, superheated steam is the energy source.

Sorbent mill 34 performs three functions: particle-particle deagglomeration; particle size reduction; and classification of particles into a) fine particles to use and/or b) coarse particles to return to the silo 30 or retention or return for further milling (particle size reduction).

Some of the larger particles are comminuted by device 34. The resulting carbonaceous sorbent has a particle size distribution of carbonaceous sorbent of $d_{50}<15$ microns, where $d_{50}$ represents 50% of the particles by mass in the entire distribution in the carbonaceous sorbent 28.

The target particle size distribution is $d_{50}<15$ microns, preferably $d_{50}<8$ microns and most preferably $d_{50}<4$ micron.

The static pressure of air leaving the separation device 34 is typically above atmospheric pressure. A steam eductor 35 connected to sorbent mill 34 moves the processed sorbent 28 to the distributor 36. A pressure of about 1-5 psig is preferred.

Distributor 36 having multiple injection lances 37 that inject the processed sorbent 28 into the flue gases, preferably between the reheater 21 and the air heater 22. This causes the sorbent 28 to be disbursed throughout the flue gases that come in physical contact with, and adsorbs gaseous pollutants, such as elemental mercury and mercury compounds in the flue gas. Dioxins and furans may also be adsorbed by the sorbent 28, as well as certain other hazardous elements and compounds such as HCl, selenium, arsenic, antimony, beryllium, cadmium, cobalt, lead, manganese, nickel, and others.

The sorbent 28 may also be injected into the flue gas stream 12 between the boiler 18 and the convective pass/superheater 20, between the convective pass/superheater 20 and the air preheater 22, or between the air preheater 22 and the ESP/fabric filter 24.

Thus, the system for removing elemental mercury or mercury compounds handles carbonaceous sorbent 28.

In an alternative embodiment, a portion of the coal pulverized in the pulverizer 16 is extracted at a location 70 from the pulverizer as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 70. A blower 72 may be required to provide the necessary motive force for moving the extracted sorbent solids 28.

As an alternative embodiment, superheated steam is sourced for tap 101 and used directly in a sorbent mill 34 without steam processing 100. Heat energy recovered may or may not be extracted with this arrangement.

The extracted sorbent solids 28 are subjected to one or more processes. The sorbent solids 28 may be sprayed with a solution 29 to deposit a halogen on the surface of the sorbent particles 28. The solution 29 is chosen from potassium iodide, iodine dissolved in potassium iodide, alkali halides (e.g. NaCl), and halide salts (e.g. $CaCl_2$), or halogen acids (e.g. HCl, HI, HBr, HF) dissolved in water. A typical additive amount is expected to have a halogen concentration in the sorbent 28 of about 0 to 10 percent by weight.

Additives 29 may also be added by injecting them into the sorbent mill 34 and mixing them with the carbonaceous sorbent 28 and heating them to a temperature that will volatilize the additive locally but distribute it by subsequent adsorption on the carbon. It is preferred that the temperature to which the carbonaceous material and additive are heated is above 400 Deg. ° F. and most preferably above 500 Deg. F, to ensure that it will be stable when injected in the flue gas at those temperatures. An example of additive 29 that can be incorporated in the above fashion is iodine or bromine. These additives 29, when added to the sorbent mill 34 are more efficiently incorporated into the processed sorbent 28, and will have greater efficiency in adsorbing gaseous pollutants.

The steam tap 101 explained in the above embodiment extracts superheated steam from the cold reheat inlet header 23 typically at 635 Deg. F. and a pressure of 600 psig. In other embodiments of the present invention, the steam tap 101 may extract superheated steam from other locations within the boiler 18. For example, the steam tap 101 could come off of:

1) the low temperature superheater inlet header. This steam is typically at 650-850 Deg. F. and 2600-3000 psig;

2) the superheater de-superheater outlet header at 650-850 Deg. F. and 2600-3600 psig;

3) the superheater outlet header at 900-1150 Deg. F. and 2500-3600 psig;

4) the reheater outlet header at 900-1150 Deg. F. and 500-700 psig;

5) the wall sootblower stations. The temperature and pressure of these vary. All of these will require differing amounts of pressure and temperature reduction that can be interactively applied by the present invention.

Several advantages of the present invention above prior art devices include the ability to grind the sorbent 28 to a finer powder to reduce moisture in the processed sorbent (28). The reduced moisture thereby reduces corrosion within the equipment of the system. Also, it was noted that by using superheated steam instead of compressed air, there was less static electricity in the sorbent. This reduced the magnetic attraction of the particles and their tendency to magnetically agglomerate in the flue gases.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for more efficiently removing pollutant gases from flue gases of a solid-fueled steam generator; the method comprising:
    storing in a silo a carbonaceous sorbent in a powdered form;
    extracting a superheated steam from a superheated steam source;
    reducing a temperature, pressure and moisture content of the superheated steam to provide a processed steam of a desired pressure, temperature and moisture content;
    providing a sorbent mill receiving the carbonaceous sorbent and the processed steam, wherein the sorbent mill is operable to de-agglomerate and comminute the carbonaceous sorbent using the processed steam to provide a processed sorbent;
    injecting the processed sorbent into the flue gases at a desired location in the solid-fueled steam generator thereby adsorbing the pollutants therefrom; and
    collecting and thereby removing the carbonaceous sorbent from the flue gas fluidly downstream from the desired location.

2. The method of claim 1, wherein the carbonaceous sorbent is powdered activated carbon.

3. The method of claim 1 further comprising pulverizing in a mill a raw solid carbonaceous fuel to form the carbonaceous sorbent in powdered form.

4. The method of claim 1, wherein the extracting superheated steam is from a low temperature superheater inlet header.

5. The method of claim 1, wherein the extracting the superheated steam is from a de-superheater outlet header.

6. The method of claim 1, wherein the extracting superheated steam is from a superheater outlet header.

7. The method of claim 1, wherein the extracting superheated steam is from a reheater outlet header.

8. The method of claim 1, wherein the extracting superheated steam is from wall sootblower stations.

9. The method of claim 1, wherein the extracting superheated steam is from a turbine intermediate stage source.

10. The method of claim 1, wherein the sorbent mill is a jet mill.

11. The method of claim 1 further comprising conveying by a steam educator the processed sorbent from the sorbent mill for injecting at the desired location using a portion of the processed steam as a motive force.

12. The method of claim 11 further comprising an air educator to convey the carbonaceous sorbent from the silo to the sorbent mill using air as the transport medium.

13. The method of claim 1, wherein the temperature of the processed steam is greater than a condensation point.

14. The method of claim 1, wherein the reducing the temperature of the superheated steam includes using at least one of a heat exchanger and a water sprayer.

15. The method of claim 14, wherein the reducing the pressure of the superheated steam includes using at least one pressure reduction valve to reduce.

16. The method of claim 15, wherein the reducing condensation of the superheated steam includes using at least one of a water trap and a drier.

17. The method of claim 1 further comprising:
    sensing at least one of the pressure, temperature, and mass flow rate of the superheated steam using at least one sensor that provides at least one signal indicative of at least one of the pressure, temperature, and mass flow rate of the superheated steam; and
    controlling at least one pressure control valve to reduce the pressure of the superheated steam in accordance with the at least one signal.

18. The method of claim 1 further comprising:
    sensing at least one of the pressure, temperature, and mass flow rate of the superheated steam using at least one sensor that provides at least one signal indicative of at least one of the pressure, temperature, and mass flow rate of the superheated steam; and
    controlling at least one of a water trap and a drier to reduce condensation of the superheated steam in accordance with the at least one signal.

19. The method of claim 1 further comprising:
    sensing the moisture content of the superheated steam using at least one sensor that provides at least one signal indicative of moisture content of the superheated steam; and
    controlling at least one moisture control valve of the steam processing device to reduce the temperature of the superheated steam in accordance with the at least one signal.

20. The method of claim 1, wherein the desired location to inject the processed sorbent in the flue gas is upstream of a pre-heater.

* * * * *